US009764673B2

(12) United States Patent
Bass et al.

(10) Patent No.: US 9,764,673 B2
(45) Date of Patent: Sep. 19, 2017

(54) LOADING RAMP AND DOOR FOR A STORAGE VEHICLE

(76) Inventors: Anthony C. Bass, Bonaire, GA (US); Robert H. Wray, Dublin, GA (US)

(*) Notice: Subject to any disclaimer, the term of this patent is extended or adjusted under 35 U.S.C. 154(b) by 630 days.

(21) Appl. No.: 13/274,935

(22) Filed: Oct. 17, 2011

(65) Prior Publication Data

US 2012/0213621 A1  Aug. 23, 2012

Related U.S. Application Data

(60) Provisional application No. 61/405,176, filed on Oct. 20, 2010.

(51) Int. Cl.
*B60P 1/43* (2006.01)
(52) U.S. Cl.
CPC .................................. *B60P 1/435* (2013.01)
(58) Field of Classification Search
CPC ............................................... B60P 1/435
USPC .................................... 414/537; 296/61, 62
See application file for complete search history.

(56) References Cited

U.S. PATENT DOCUMENTS

| 4,792,274 | A | * | 12/1988 | Cockram ................... 414/537 |
| 4,878,339 | A | * | 11/1989 | Marier et al. ............... 56/14.7 |
| 4,979,867 | A | * | 12/1990 | Best .......................... 414/537 |
| 5,156,432 | A | * | 10/1992 | McCleary ................... 296/61 |
| 5,507,138 | A | * | 4/1996 | Wright et al. ............... 56/14.7 |
| 5,678,984 | A | * | 10/1997 | Petersen .................... 414/537 |
| 6,102,646 | A | * | 8/2000 | Bass et al. .................. 414/537 |
| 6,135,532 | A | * | 10/2000 | Martin ....................... 296/61 |
| 6,817,676 | B2 | * | 11/2004 | Anemone ............ B60P 1/165 298/18 |
| 7,150,487 | B2 | * | 12/2006 | Devitt et al. ................ 296/61 |
| 2008/0292439 | A1 | * | 11/2008 | Dunkel ...................... 414/537 |

* cited by examiner

*Primary Examiner* — Jonathan Snelting
(74) *Attorney, Agent, or Firm* — Russell L. Sandidge

(57) ABSTRACT

A loading ramp for a vehicle having a storage area is disclosed, wherein the loading ramp may also serve as a substantially weather tight door for the storage area. The loading ramp comprises a frame structure attached to the vehicle by angled extension members that allow the bottom of the frame to extend below the floor of the storage area. The loading ramp is pivotally attached to the frame. A dovetail structure is built onto the angled extension members, the dovetail being angled to match the angle of the ramp. A hydraulic cylinder and automatic control system is also provided to assist in raising and lowering the ramp.

18 Claims, 8 Drawing Sheets

LOADING RAMP AND DOOR FOR A STORAGE VEHICLE

PRIORITY CLAIM TO RELATED APPLICATIONS

The present United States non-provisional patent application is related to, and hereby claims priority to, and the full benefit of the filing date of provisional patent application Ser. No. 61/405,176, filed on Oct. 20, 2010 by the same named inventors, incorporated herein by reference.

TECHNICAL FIELD

The present invention relates generally to a combination storage door and loading ramp for a storage vehicle, and, more specifically, to a substantially sealable rear door that converts into a loading ramp for a storage truck or van.

BACKGROUND OF THE INVENTION

Ramps attachable to the rear of a truck or similar vehicle are known in the art. For example, see U.S. Pat. Nos. 4,979,867; 5,156,432; 5,678,984; and 6,102,646, the disclosures of which are incorporated herein by reference. Unfortunately, conventional ramps are not particularly well-adapted for enabling multi-axle items such as power equipment, loading carts, and the like to board and exit the storage area of the vehicle. Many such ramps are made of expanded metal, which is not strong enough to support heavier equipment and is a very poor door if the equipment is intended to be stored full time. Other ramps use solid steel, but since a solid steel ramp is often too heavy for one person to operate, the ramp is split into two pieces that are raised and lowered separately.

In addition, conventional ramps are typically shaped undesirably and may cause rolling equipment to scrape the ramp or vehicle floor due to the acute angle that the ramp connects with the floor of the storage area. For example, if lawn equipment is being loaded or unloaded, the cutter deck may scrape the floor of the storage area as it enters or exits the ramp. To combat this problem, many ramp structures use what is known as a "dovetail" design, in which a desired angle is built into the ramp and or truck floor that decreases the angle at which the ramp structure contacts the storage floor. There is a problem with the typical location of these dovetails, however. If the dovetail is built outside of the truck storage area, the ramp then hangs off the dovetail and cannot be used as the door of the truck. If the dovetail is built inside the truck storage area, then it typically takes up too much space and dramatically reduces the storage area inside the truck.

Other designs have attempted to build the ramp long enough that the connection between the ramp and the floor creates a gentler angle for the equipment, however, such ramps may be too long to be useful as the door of the storage area unless the ramp is foldable in some way. (e.g. see U.S. Pat. Nos. 4,878,339 and 5,507,138, the disclosures of which are hereby incorporated herein by reference)

It is apparent from the above that there exists a need in the art for a more efficient ramp structure for enabling multi-axle items, such as self-propelled lawn mowers or similar equipment, to be driven into and off of a corresponding vehicle for transporting the same. There also exists a need in the art for such a ramp which also functions as the rear gate/door of such a vehicle.

It is a purpose of this invention to fulfill any and/or all of the above-described needs in the art, as well as other needs which will become apparent to the skilled artisan from the following detailed description of this invention.

SUMMARY OF THE INVENTION

Briefly described, an object of the present invention is to provide a rear door that also serves as a loading ramp, combined with an interior dovetail placed inside the storage body of the truck to assist with loading equipment.

Another object of this invention is to provide a loading ramp which also functions as a substantially weather tight rear gate/door of such truck. The loading ramp comprises a frame and a ramp having a bottom edge pivotally attached within the frame so that the ramp may serve as a door for the storage area of a vehicle when in the closed position and as a loading ramp when in the open position. The loading ramp further comprises angled extension members attached to the frame, that provide for the bottom edge of the frame to extend below the floor of the storage area. The present invention further provides a dovetail positioned on top of the extension members, the dovetail having an angled portion that substantially matches the angle of the open loading ramp.

It is another object of this invention to provide a hydraulic cylinder attached to the loading ramp to assist in raising and lowering the ramp to use it as a ramp or a door for the storage area.

Still another object of this invention is to provide a hinge and frame structure so that the ramp and dovetail design may be fitted to a storage vehicle. In one embodiment of the invention, the hinges are positioned internally to the loading ramp such that the ramp may pivot within the frame structure rather than pivoting away from the frame structure.

Yet another object of this invention is to provide a frame extension that will support a ramp and dovetail structure, wherein the dovetail is enclosed within the interior of the truck.

BRIEF DESCRIPTION OF THE DRAWINGS

Accordingly, the present invention will be understood best through consideration of, and reference to, the following Figures, viewed in conjunction with the Detailed Description of the Invention referring thereto, in which like reference numbers throughout the various Figures designate like structure and in which.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

In accordance with the present invention, a storage vehicle, such as a fully enclosed storage truck, covered van body, and the like, is provided that includes an angled extension built into the storage area, a dovetail structure as part of the extension, and a substantially weather tight door enclosing the storage area of the vehicle. By "substantially weather tight" it is meant that the openings between the door and frame may be small enough to protect the contents of the truck from weather events, such as rain or snow. The door is typically not considered "air tight" or "water tight", as those terms are generally understood, although such precise sealability is contemplated within this invention.

Figure 1:
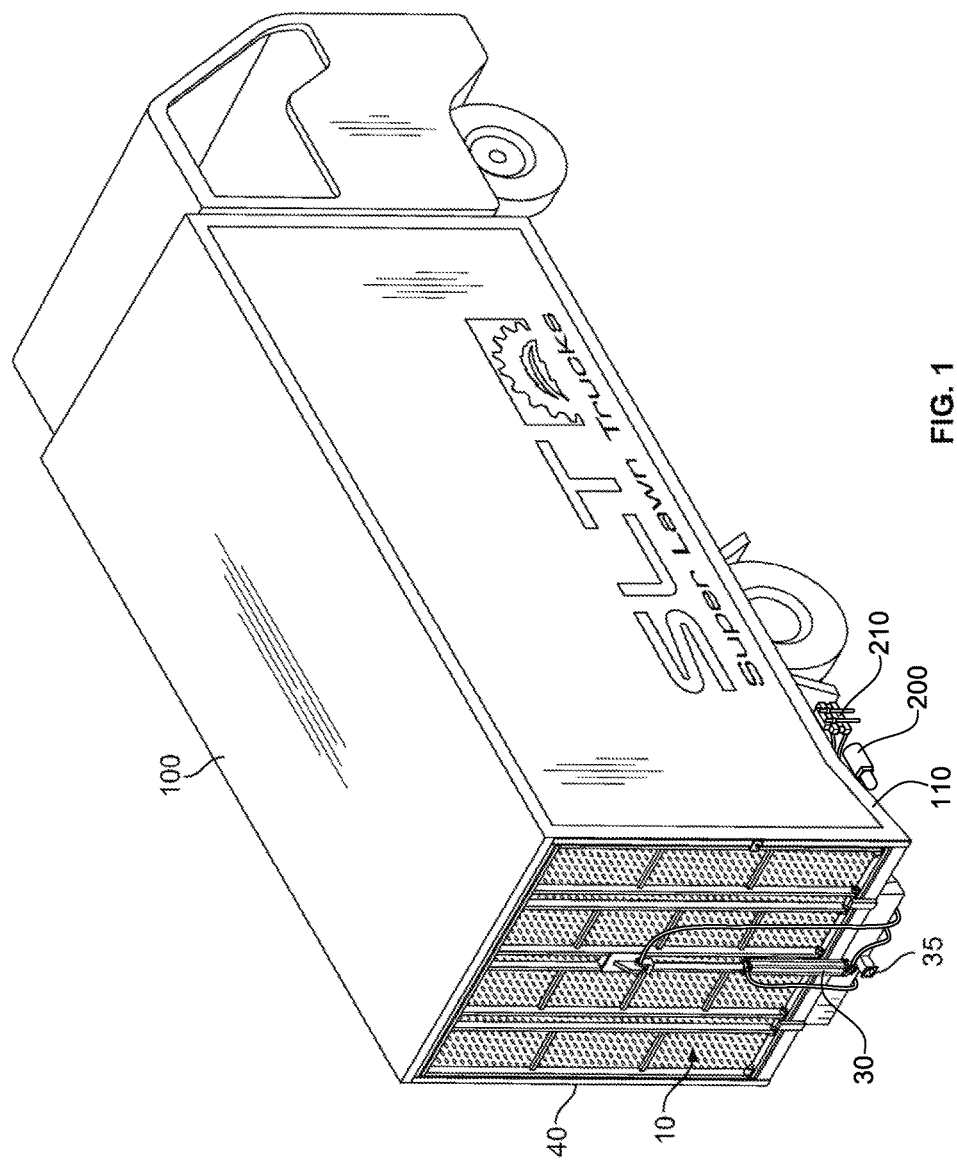
FIG. 1 is a completed truck incorporating one embodiment of the present invention in which the frame is extended and includes an internal dovetail.

Turning now to FIG. 1, a typical storage truck 100 including one embodiment of the present invention is shown. Truck 100 includes rear door 10, which may preferably be comprised of a solid metal material. As can be seen in the figure, rear door 10 fits within the exterior frame 40 of truck 100, so that rear door 10 may easily be substantially weather tight, and could even be made water tight or air tight if desired. The enclosed body of truck 100 also includes angled extension area 110, which is noticeable in the way the rear of the storage area is shaped. The creation of angled extension area 110 is more fully explained below.

Figure 2:
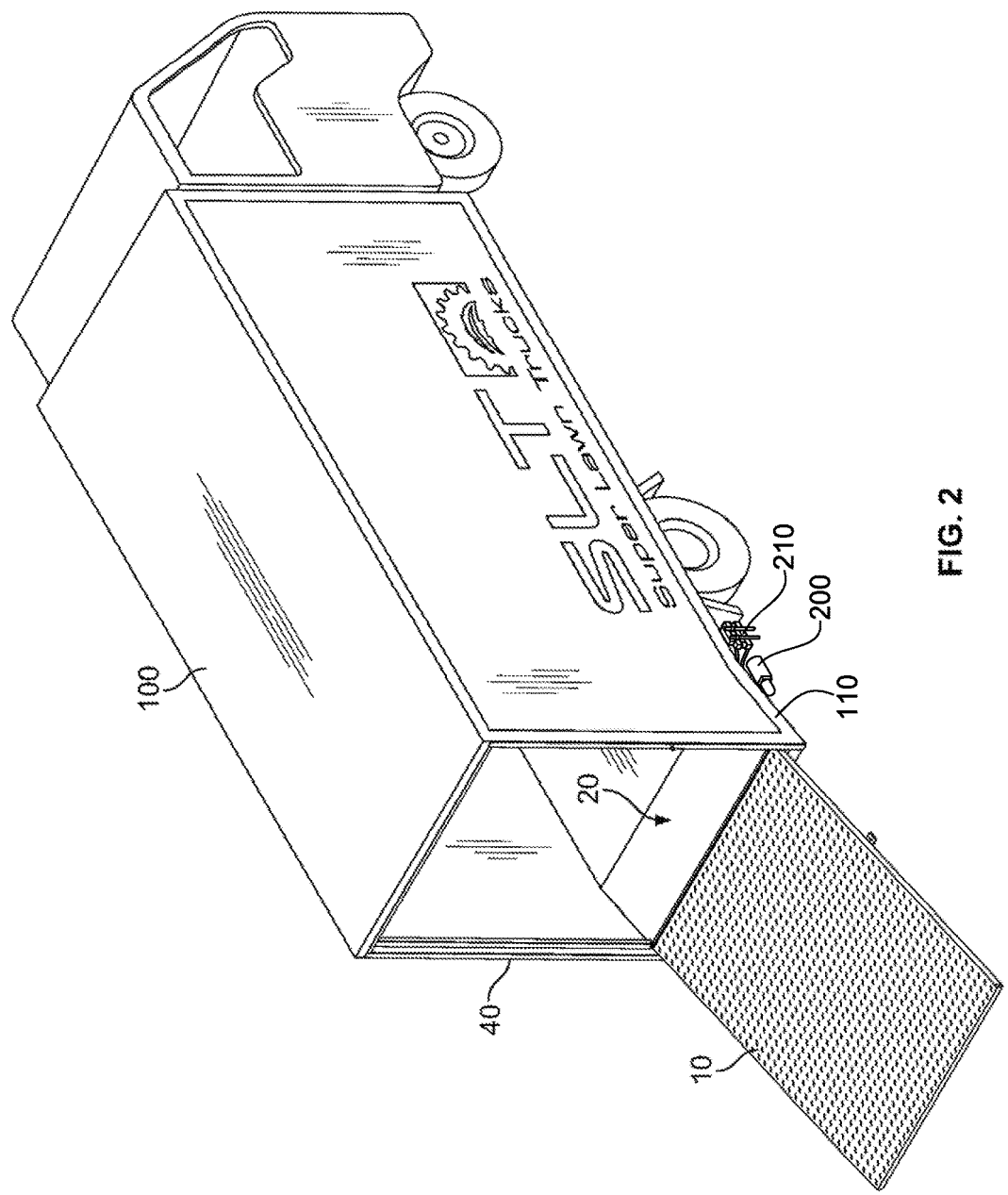
FIG. 2 is the truck of FIG. 1 with the door open to be used as a loading ramp.

FIG. 2 illustrates the same truck 100 as shown in FIG. 1, with door/loading ramp 10 opened into the loading ramp position. Dovetail 20 is built into angled extension area 110. The angle of dovetail 20 is preferably about the same angle as loading ramp 10 in the open position, so that there is a relatively smooth transition between loading ramp 10 and dovetail 20.

Figure 3:
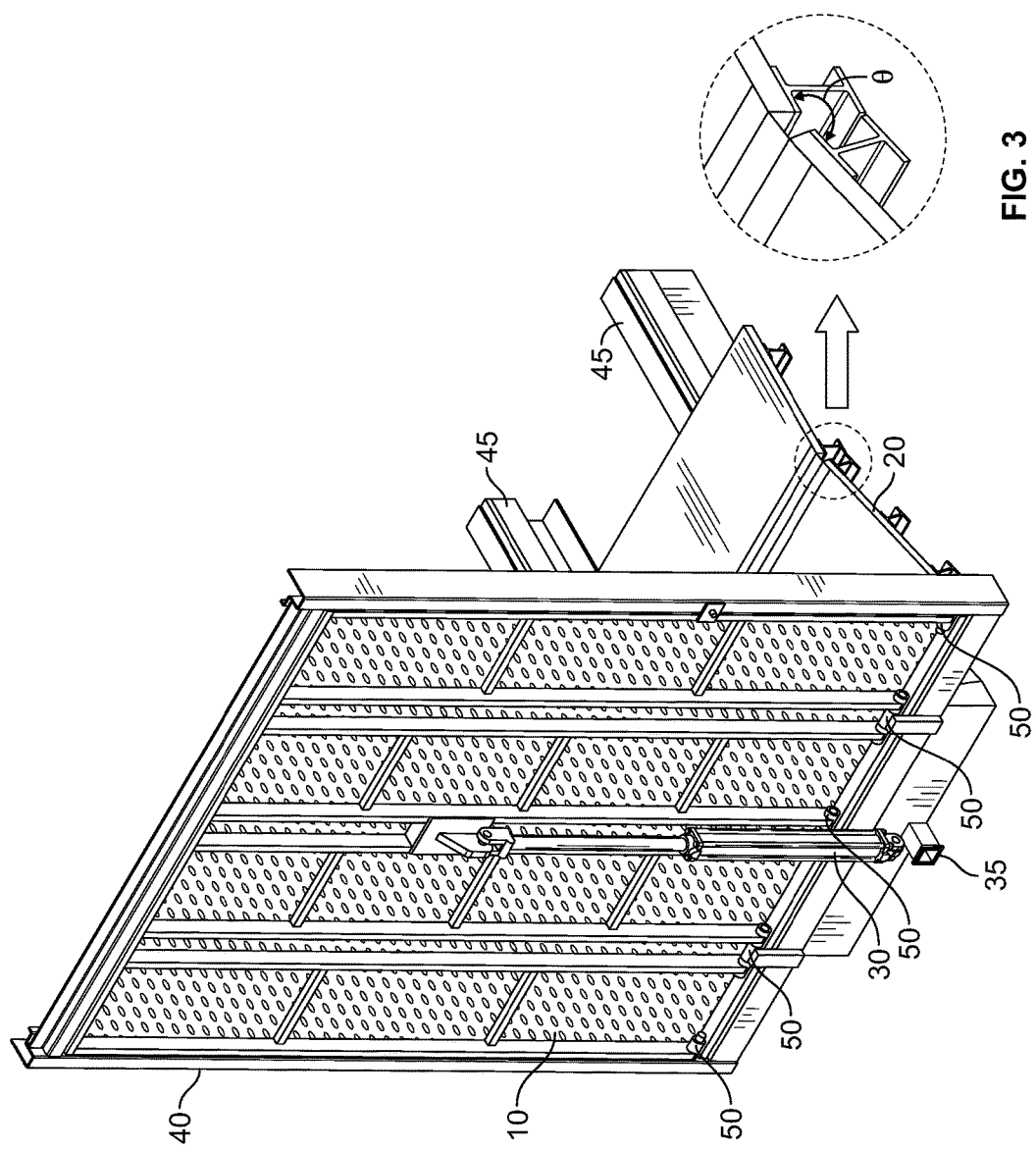
FIG. 3 is a perspective view of a frame extension of the present invention, showing the ramp and dovetail loading deck feature of the present invention, with the body of the storage truck not included.

Turning now to FIG. 3, a structure embodying many features of the present invention is shown. The illustrated structure may be attached to the service rails or long seals of a standard storage truck or van prior to, or during, construction of the storage body of that vehicle. The structure shown in FIG. 2 includes frame 40 that has extension members 45 that may attach to the service rails of a standard storage truck. As illustrated in FIG. 2, frame 40 is the frame for the rear door and the side walls and roof will attach to frame 40. In practice, frame 40 may actually include more of the storage body than illustrated, but should at least provide a frame for loading ramp/door 10. Frame 40 may also include a standard trailer hitch 35, as shown in the figures, that may be accessed when loading ramp/door 10 is in the closed position. Extension members 45 include a downward angle θ towards the rear to provide for construction of dovetail 20 that is fully interior to the storage truck. The result of using extension members 45 is that the bottom edge of frame 40 is positioned below the floor of the storage area, and optionally further rearward than a conventional frame may be. The length of extension members 45 is primarily based upon the length of the rails in the original truck, but should be sufficiently long that the created dovetail has clearance from the rear wheels. The dovetail is preferably kept as short as possible to both maximize the flat floor space in the storage area and minimize the length of the overall truck body.

FIG. 3 also shows a ramp/door 10 that may fit within frame 40 and may substantially seal the storage section of a truck or van. Ramp 10 is preferably comprised of a solid steel, and may include surface features such as the illustrated dimple pattern to assist with traction on the ramp. Such pattern may help reduce slip and fall issues, as well as assist with loading and unloading power equipment. Ramp 10 fits within the rear, upright members of frame extension 40, and may provide for a substantially weather tight seal between ramp 10 and frame 40. Most conventional loading ramp structures do not fit within the frame structure as shown here, and instead have a cross section that is larger than the storage area of the truck, so that the door just lays flat against the entire opening of the truck. By fitting ramp 10 within frame 40, the present invention not only becomes substantially weather tight, but also saves weight by utilizing a slightly smaller ramp 10.

The structure of FIGS. 1-3 may preferably include hydraulic cylinder 30 attached to ramp 10 and frame extension 40 to assist in raising and lowering ramp 10. By using the correct size hydraulic cylinder 30, ramp 10 may be easily raised and lowered by just one individual. In an alternative embodiment of the present invention, the structure may include hydraulic pump 200 in fluid communication with hydraulic cylinder 30 and a power operating system 210 for hydraulic pump 200 as shown in FIGS. 1 and 2, so that ramp 10 may be raised and lowered via power operating system 210. A possible configuration for power operating system 210, hydraulic pump 200 and the fluid communication with hydraulic cylinder 30 is described in U.S. Pat. No. 6,102,646 issued to one of the herein named inventors, and previously incorporated herein by reference.

Figure 4:
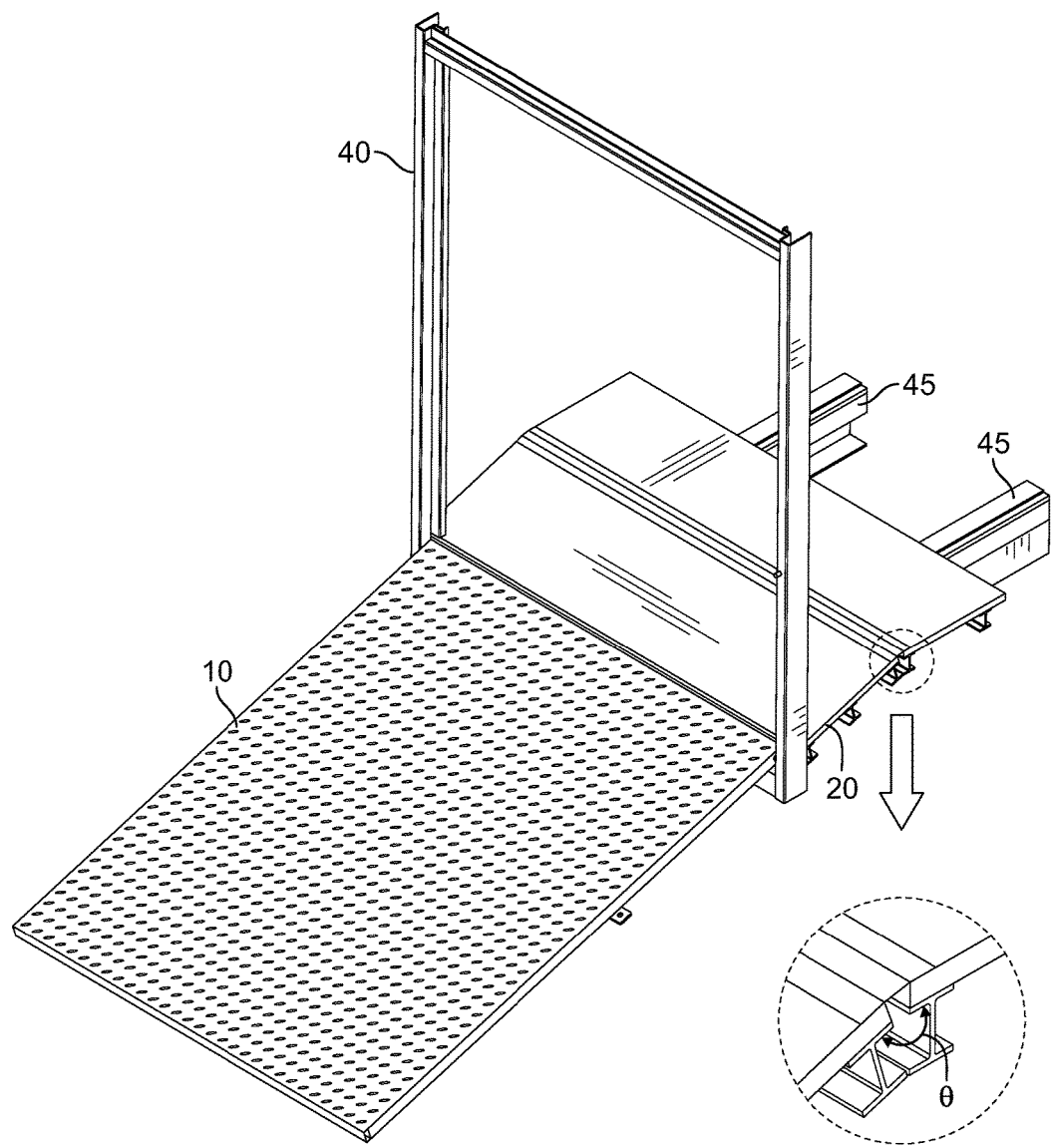
FIG. 4 is a similar perspective view as FIG. 3, with the ramp lowered into the loading position.

Turning now to FIG. 4, the structure of FIG. 3 is shown with door/loading ramp 10 lowered into the loading ramp position. The utility of dovetail loading deck 20 may be appreciated from this illustration. If dovetail loading deck 20 were not included, then the end of ramp 10 would have to abut the substantially horizontal floor of the storage area of the truck. This abrupt change of angle from the loading ramp to horizontal is typically too acute for power equipment, such as lawn equipment, to traverse without scraping the bottom of the equipment. If a gentler angle is desired, such as about 18 to about 22 degrees, preferably no more than 20 degrees, then the typical solution is to extend the length of the ramp. Loading deck 20 essentially provides for an interior extension to ramp that may then be leveled off via the dovetail shape of loading deck 20.

By way of example, a loading ramp of a light duty truck typically needs to be about 10 feet long to achieve the desired angle with the floor of the storage area. A 10 foot ramp, however, is too long to serve as the rear door of the truck. By utilizing the present invention, the ramp may be about 8 feet long, with an additional 2 feet incorporated into the interior dovetail of loading deck 20, so that the ramp may then serve as a one-piece rear door of the truck.

For current truck designs that utilize an interior dovetail, but do not use angled frame members 45, the dovetail may need to be 4 feet long or more to achieve the desired angle.

This is 4 feet of a loading deck structure that is built into the storage area, taking up valuable storage space. Thus, the present invention may save as much as two feet of loading space within the truck.

Figure 5:
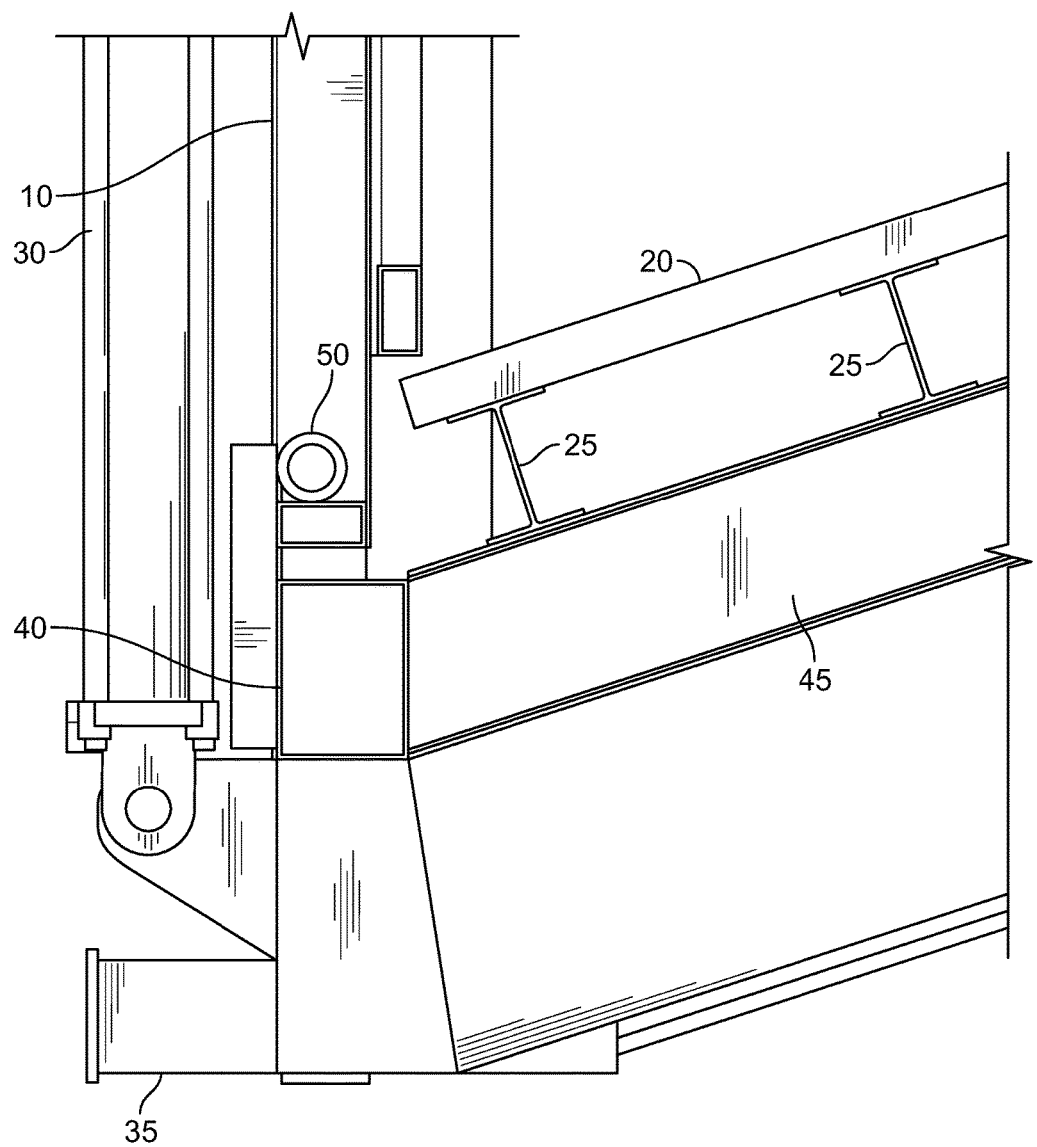
FIG. 5 is a close up, cutaway side view of the ramp and deck shown in FIG. 2, with the ramp in the closed position.
Figure 6:
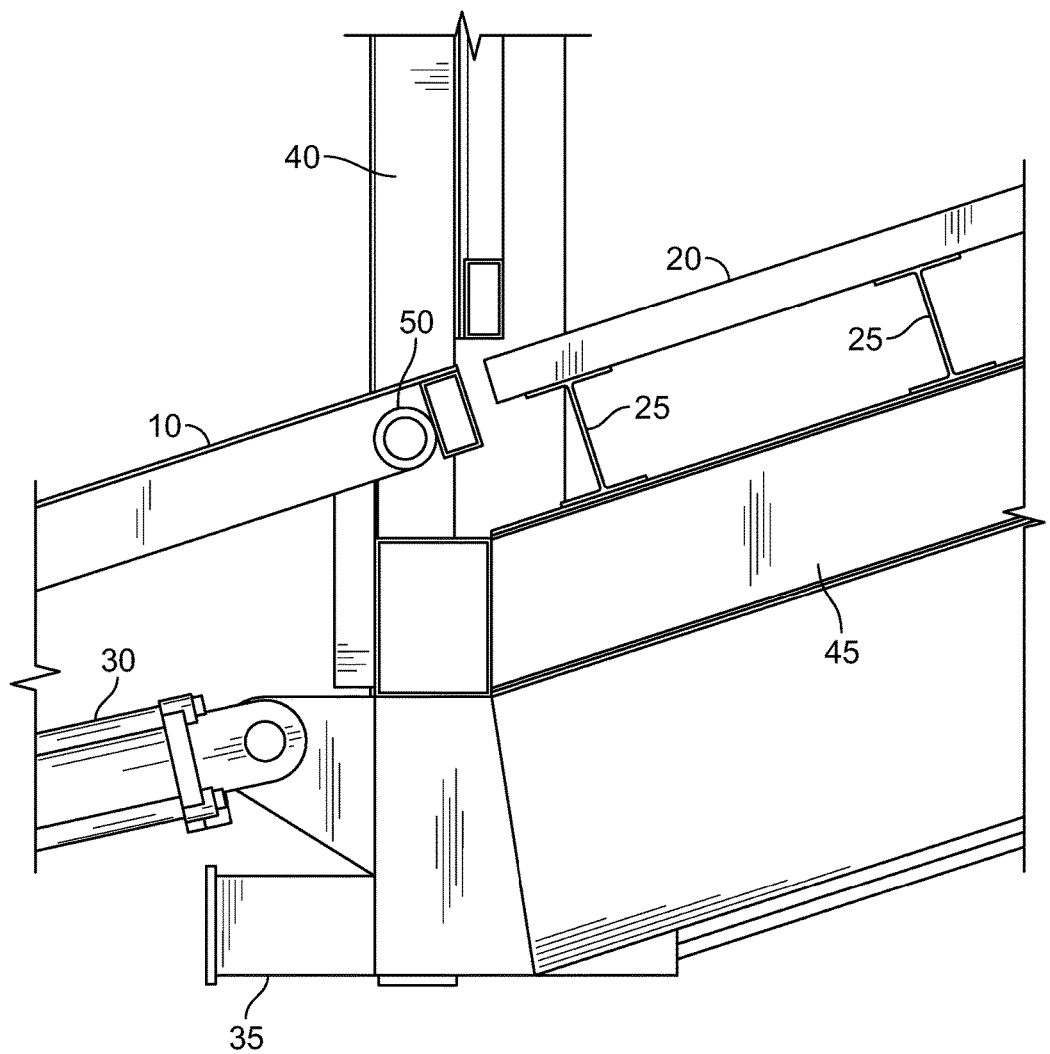
FIG. 6 is a similar view as FIG. 5 with the ramp in the loading position.

As shown more clearly in FIGS. 5 and 6, loading deck 20 may preferably include support beams 25 to give strength to loading deck 20. If support beams 25 are used, then loading deck 20 may support higher weights even though it may be constructed from lighter material than ramp 10. In a preferred embodiment, loading deck 20 is comprised of wood, which may help maintain a low weight for the truck. However, dovetail loading deck 20 may be comprised of any sturdy material suitable for the intended purpose, such as steel, plastic, and the like.

FIG. 6 also shows how the angle of ramp 10 may be matched by the angle of loading deck 20. As shown, there is a small gap between ramp 10 and deck 20, and the angle of the two respective pieces might not be identical, but these angles should at least be close enough that the power equipment may traverse the transition between ramp 10 and deck 20 without difficulty.

FIGS. 5 and 6 provide further illustration of the hinges 50 that attach ramp 10 to the frame 40 to allow for raising and lowering ramp 10. Hinges 50 are preferably designed to be substantially within the structure of ramp 10, as opposed to being exterior hinges. If hinges 50 are standard, external hinges that attach to ramp 10 and frame 40—for example, similar to common door hinges used in homes—then the ramp will pivot way from the frame when it is opened, and the transition gap between ramp 10 and dovetail loading deck 20 may become difficult to traverse due to a wide gap or poor angle between ramp 10 and deck 20. As shown in FIGS. 5 and 6, hinges 50 may preferably be designed to fit within the ramp 10, so that ramp 10 pivots within frame 40 and maintains a close connection with deck 20.

Figure 7:
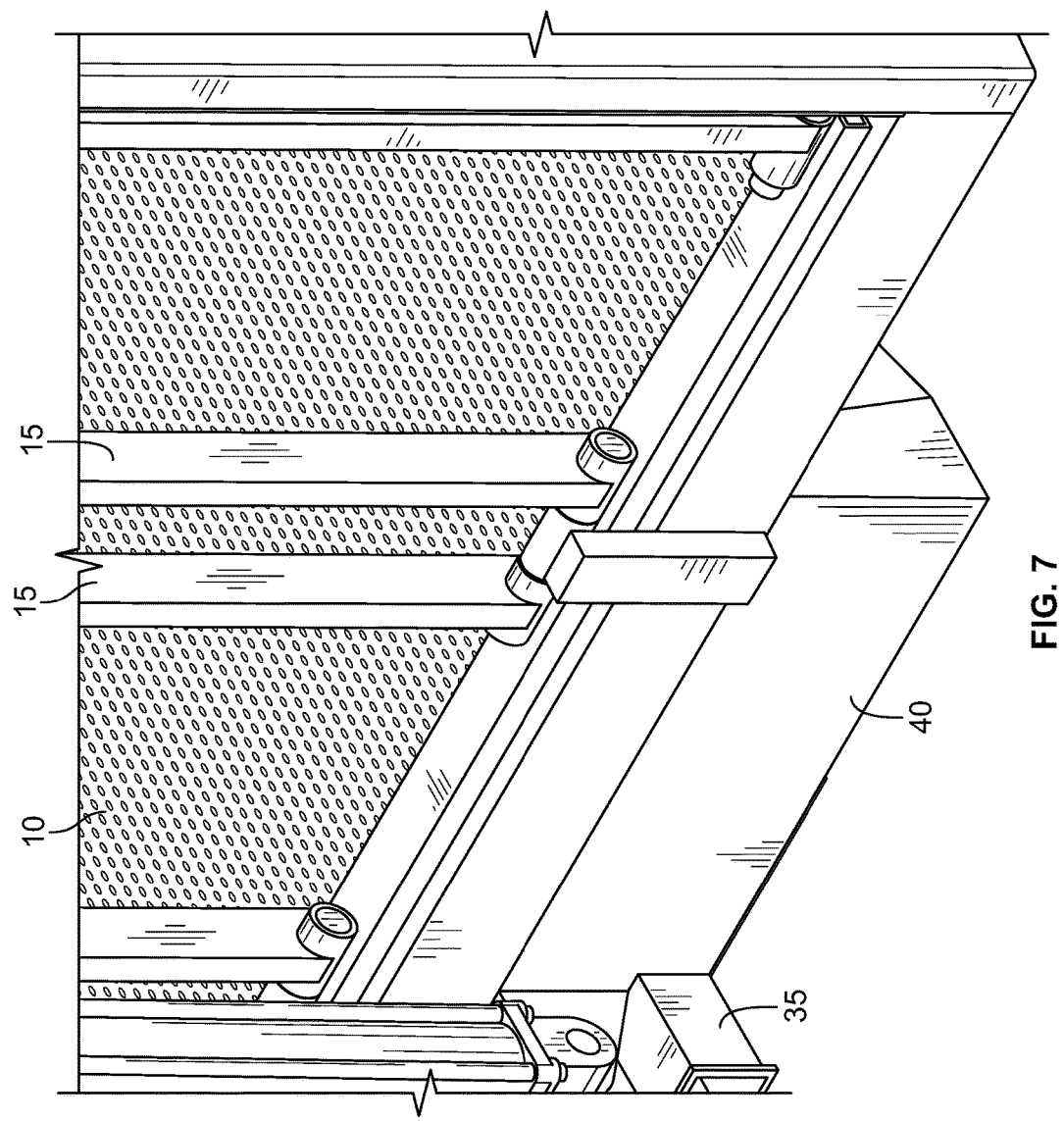
FIG. 7 is a close up view of possible hinges used in connection with the present invention.
Figure 8:
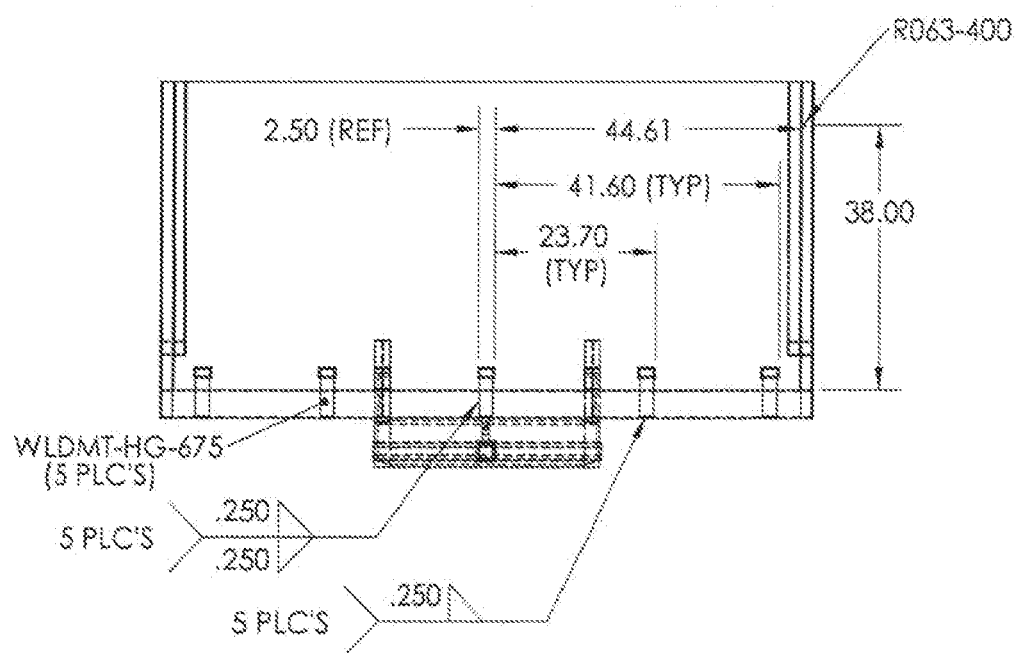
FIG. 8 is a rear view of one possible configuration of hinges for the present invention.
Figure 9:
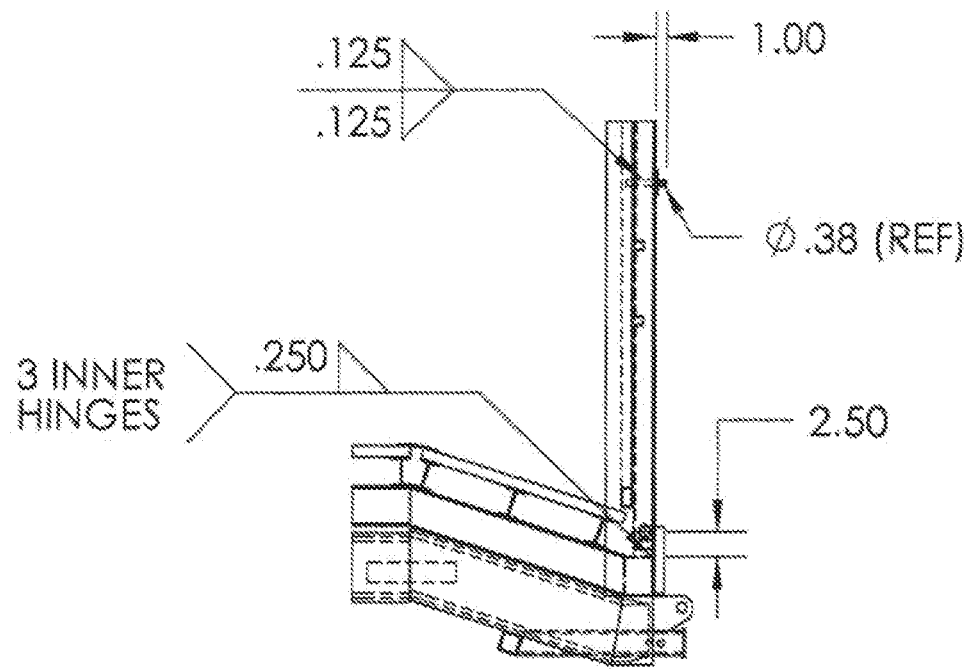
FIG. 9 is a side view of one possible configuration of hinges for the present invention.

In one preferred embodiment illustrated in the FIG. 7, ramp 10 includes support members 15, and hinges 50 are connected to support members 15. In such preferred embodiment, the invention includes as many as five hinges 50, with two hinges located on the outer edge, and three inner hinges for the ramp. Possible configurations of such preferred hinges are shown in FIGS. 8 and 9.

Having thus described exemplary embodiments of the present invention, it should be noted by those skilled in the art that the disclosures herein are exemplary only and various other alternatives, adaptations, and modifications may be made within the scope and spirit of the present invention. Accordingly, the present invention is not limited to the specific embodiments as illustrated herein, but is only limited by the following claims.

What is claimed is at least:

1. A loading ramp for a vehicle having an enclosed storage area, the storage area having a floor, a roof, side walls, and a rear opening, said loading ramp comprising;
    a door frame at the rear opening of the storage area, the door frame having top, bottom, and side surfaces, the surfaces connected to define a fixed opening;
    extension members attached to the vehicle and to the frame, said extension members angled downward from the vehicle such that the bottom surface of the frame is located below the floor of the storage area;
    a ramp having a bottom edge pivotally attached within said frame so that the ramp may act as a door for the storage area of the vehicle when in a closed position, and as an angled loading ramp when in an open position;
    a dovetail loading deck positioned within the storage area and on top of the extension members, the deck having an angled portion that substantially matches the angle of the opened loading ramp;
    wherein the ramp fits completely within the door frame when it is in the closed position and substantially seals the storage area of the vehicle.

2. The loading ramp of claim 1, further comprising a hydraulic cylinder attached to the ramp to assist in opening and closing the ramp.

3. The loading ramp of claim 2, wherein the hydraulic cylinder is attached to a hydraulic pump and an operating system so that the operating system may be used to extend or retract the hydraulic cylinder, thereby opening or closing the ramp.

4. The loading ramp of claim 1, wherein the dovetail loading deck has a second portion that is substantially horizontal.

5. The loading ramp of claim 4, wherein the angle between the angled portion of the dovetail and the substantially horizontal portion of the dovetail is from about 15 to about 25 degrees.

6. The loading ramp of claim 5, wherein the angle is from about 18 degrees to about 22 degrees.

7. The loading ramp of claim 1 wherein the ramp acts as a substantially weather tight door for the storage area of the vehicle when in a closed position.

8. The loading ramp of claim 1, wherein the pivotal connection between the ramp and the frame comprises hinges attached to a bottom edge of the ramp.

9. The loading ramp of claim 8, wherein the hinges are located substantially internally to the ramp so that the bottom edge of the ramp remains substantially within the frame when the ramp is in the open position.

10. The loading ramp of claim 1 wherein the ramp is one piece and may fit within the door frame without folding.

11. A loading ramp for a vehicle having an enclosed storage area, the storage area having a floor, a roof, side walls, and a rear opening, said loading ramp comprising;
    a door frame at the rear opening of the storage area, the door frame having top, bottom, and side surfaces, the surfaces connected to define a fixed opening;
    extension members attached to the vehicle and to the frame, said extension members angled downward from the vehicle such that the bottom surface of the frame is located below the floor of the storage area;
    a ramp having a bottom edge pivotally attached within said frame so that the ramp may act as a door for the storage area of the vehicle when in a closed position, and as an angled loading ramp when in an open position;
    a dovetail loading deck positioned within the storage area and on top of the extension members, the deck having an angled portion that substantially matches the angle of the opened loading ramp, and a substantially horizontal portion; and
    a hydraulic cylinder attached to the ramp to assist in opening and closing the ramp;
    wherein the ramp fits completely within the door frame when it is in the closed position and substantially seals the storage area of the vehicle.

12. The loading ramp of claim 11, wherein the hydraulic cylinder is attached to a hydraulic pump and an operating system so that the operating system may be used to extend or retract the hydraulic cylinder, thereby opening or closing the ramp.

13. The loading ramp of claim 11 wherein the ramp acts as a substantially weather tight door for the storage area of the vehicle when in a closed position.

14. The loading ramp of claim 11, wherein the pivotal connection between the ramp and the frame comprises hinges attached to a bottom edge of the ramp.

15. The loading ramp of claim 14, wherein the hinges are located substantially internally to the ramp so that the bottom edge of the ramp remains substantially within the frame when the ramp is in the open position.

16. The loading ramp of claim 11, wherein the angle between the angled portion of the dovetail and the substantially horizontal portion of the dovetail is from about 15 to about 25 degrees.

17. The loading ramp of claim 16, wherein the angle is from about 18 degrees to about 22 degrees.

18. A loading ramp for a vehicle having an enclosed storage area, the storage area having a floor, a roof, side walls, and a rear opening, said loading ramp comprising;

- a door frame at the rear opening of the storage area, the door frame having top, bottom, and side surfaces, the surfaces connected to define a fixed opening;
- extension members attached to the vehicle and to the frame, said extension members fixably attached to the vehicle and angled downward from the vehicle such that the bottom surface of the frame is located below the floor of the storage area;
- a ramp having a bottom edge pivotally attached within said frame so that the ramp may act as a door for the storage area of the vehicle when in a closed position, and as an angled loading ramp when in an open position;
- a dovetail loading deck positioned within the storage area and on top of the extension members, the deck having an angled portion that substantially matches the angle of the opened loading ramp, and a substantially horizontal portion, the angle between the angled portion and the substantially horizontal portion being between about 18 and 22 degrees; and
- a hydraulic cylinder attached to the ramp to assist in opening and closing the ramp;

wherein the ramp fits completely within the door frame when it is in the closed position and substantially seals the storage area of the vehicle.

\* \* \* \* \*